United States Patent
Cook et al.

(10) Patent No.: US 12,535,339 B2
(45) Date of Patent: Jan. 27, 2026

(54) SCALE CONFIGURATION FOR INDUCTIVE POSITION ENCODER

(71) Applicant: Mitutoyo Corporation, Kawasaki (JP)

(72) Inventors: Ted Staton Cook, Kirkland, WA (US); James Allen Hitchman, Seattle, WA (US); Yoshiaki Kato, Kanagawa (JP)

(73) Assignee: MITUTOYO CORPORATION, Kanagawa-Ken (JP)

( * ) Notice: Subject to any disclaimer, the term of this patent is extended or adjusted under 35 U.S.C. 154(b) by 619 days.

(21) Appl. No.: 16/021,528

(22) Filed: Jun. 28, 2018

(65) Prior Publication Data

US 2020/0003581 A1 Jan. 2, 2020

(51) Int. Cl.
*G01D 5/20* (2006.01)
*G01B 3/20* (2006.01)

(52) U.S. Cl.
CPC ............. *G01D 5/202* (2013.01); *G01B 3/205* (2013.01)

(58) Field of Classification Search
CPC ........ G01D 5/12; G01D 5/202; G01D 5/2026; G01D 5/2053; G01D 5/206; G01D 5/2225; G01D 5/2233; G01D 5/34776; G01D 5/2013; G01D 5/2046; G01D 5/249; G01D 5/2454; G01D 5/2455; G01D 5/2275; G01D 5/2283; G01D 5/14; G01B 3/20; G01B 3/205; G01B 7/14
See application file for complete search history.

(56) References Cited

U.S. PATENT DOCUMENTS

| | | | |
|---|---|---|---|
| 5,576,537 A | 11/1996 | Holzapfel et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,901,458 A | 5/1999 | Andermo et al. | |
| 5,973,494 A | 10/1999 | Masreliez et al. | |
| 6,002,250 A | 12/1999 | Masreliez et al. | |
| 6,011,389 A | 1/2000 | Masreliez et al. | |
| 6,054,851 A * | 4/2000 | Masreliez ............ | G01D 5/2053 324/207.17 |
| 6,124,708 A * | 9/2000 | Dames ................. | G01D 5/2053 324/207.12 |
| RE37,490 E | 1/2002 | Andermo et al. | |
| 6,400,138 B1 | 6/2002 | Andermo | |

(Continued)

*Primary Examiner* — David M Schindler
(74) *Attorney, Agent, or Firm* — Seed Intellectual Property Law Group LLP

(57) ABSTRACT

An inductive type position encoder includes a scale, a detector portion and a signal processor. The scale includes a periodic pattern of signal modulating elements (SME) arranged along a measuring axis, with a spatial wavelength W1. One type of SME in the pattern comprises similar conductive plates or loops. The detector portion comprises sensing elements and a field generating coil that generates a changing magnetic flux. The sensing elements may comprise conductive loop portions arranged along the measuring axis and configured to provide detector signals which respond to a local effect on the changing magnetic flux provided by adjacent SME's. In various implementations, the first type of SMEs have an average dimension DSME along the measuring axis direction that is greater than DSEN and at least 0.55*W1 and at most 0.8*W1, which provides advantageous detector signal characteristics.

16 Claims, 5 Drawing Sheets

(56) References Cited

U.S. PATENT DOCUMENTS

| | | | |
|---|---|---|---|
| 7,196,510 B2 * | 3/2007 | Kawatoko | G01D 5/2053 |
| | | | 324/207.17 |
| 9,228,823 B2 * | 1/2016 | Fontanet | H01F 17/0013 |
| 9,958,294 B2 | 5/2018 | Cook | |
| 2018/0058883 A1 | 3/2018 | Cook | |
| 2018/0087928 A1 * | 3/2018 | Jones | G01D 5/2073 |
| 2018/0113004 A1 | 4/2018 | Cook | |
| 2018/0195880 A1 | 7/2018 | Cook | |

* cited by examiner

SCALE CONFIGURATION FOR INDUCTIVE POSITION ENCODER

BACKGROUND

Technical Field

This disclosure relates to measurement instruments and, more particularly, to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale.

U.S. Pat. No. 6,011,389 (the '389 patent) describes an induced current position transducer usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. patent application Ser. Nos. 15/245,560; 15/850,457; and 15/910,478 disclose winding configuration refinements that are useful for enhancing the accuracy, robustness, and ease of alignment of inductive position encoders. All of the foregoing are hereby incorporated herein by reference in their entireties. As described in these patents and applications, an induced current transducer may be manufactured using printed circuit board technology and is largely immune to contamination. However, such systems may be limited in their ability to provide certain combinations of features desired by users, such as combinations of compact size, high resolution, accuracy, low cost, robustness to contamination, etc. Configurations of encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction. In various implementations, the electronic position encoder includes a scale, a detector portion and a signal processing configuration.

The scale extends along the measuring axis direction and includes a periodic scale pattern comprising at least a first type of signal modulating elements. The periodic scale pattern has a spatial wavelength W1. The signal modulating elements of the first type comprise similar conductive plates or similar conductive loops that are located along the measuring axis direction corresponding to the spatial wavelength W1. The detector portion is configured to be mounted proximate to the periodic scale pattern and to move along the measuring axis direction relative to the periodic scale pattern. In various implementations, the detector portion includes a field generating coil and a set of sensing elements. The field generating coil is fixed on a substrate and surrounds an interior area that is aligned with the periodic scale pattern of signal modulating elements during operation. As used herein, the term "surrounds" may mean completely surrounds, or partially surrounds, in various implementations. The only constraint is that the field generating coil is configured to generate a changing magnetic flux in the interior area in response to a coil drive signal, in a manner that supports operation according to the principles disclosed and claimed herein. The set of sensing elements is arranged along the measuring axis direction and fixed on the substrate. The members of the set of sensing elements comprise conductive loops or conductive loop portions having a nominal sensing element width dimension DSEN along the measuring axis direction, at least for that portion of the sensing element that is aligned with or overlaps the interior area surrounded by the filed generating coil. The set of sensing elements are configured to provide detector signals which respond to a local effect on the changing magnetic flux that is provided by adjacent signal modulating elements of the scale pattern. The signal processing configuration is operably connected to the detector portion to provide the coil drive signal and to determine the relative position between the detector portion and the scale pattern based on detector signals input from the detector portion.

The signal modulating elements of the first type include an effective region that is aligned with or overlaps the interior area during operation. In various implementations, the effective region is configured to have an average dimension DSME along the measuring axis direction wherein DSME is greater than the nominal sensing element width dimension DSEN along the measuring axis direction, and DSME is at least 0.55*W1 and at most 0.8*W1. Such a configuration provides advantageous detector signal characteristics (e.g., by providing better a signal to noise (S/N) ratio, and/or reduced error components, in the detector signals), according to principles disclosed herein.

In some implementations, the average dimension DSME is at most 1.6*DSEN. In some implementations, 0.45*W1<DSEN<0.55*W1. In some implementations, DSEN is approximately 0.5*W1. In some implementations, the average dimension DSME is at least 0.6*W1, or 0.66*W1, or 0.7*W1 (e.g., the use of larger values of DSME may be advantageous when using larger operating gaps between the detector and the scale, and/or when the signal modulating elements of the first type comprise the similar conductive plates.)

In various implementations, the signal modulating elements of the first type may comprise similar conductive plates. In various implementations, the signal modulating elements of the first type may comprise similar conductive loops.

In various implementations, signal modulating elements of a second type are located between the signal modulating elements of the first type along the measuring axis direction. The signal modulating elements of a second type are configured to have relatively less effect on the changing magnetic flux in comparison to the signal modulating elements of the first type. In some implementations, the signal modulating elements of the second type comprise regions of non-conductive material. In some such implementations, the signal modulating elements of the second type comprise regions of a non-conductive scale substrate, wherein the first type of signal modulating elements are fixed on the non-conductive scale substrate.

In various implementations, the detector portion and the scale may include approximately planar substrates and the detector portion may be configured to be mounted approximately parallel to the periodic scale pattern with a nominal operating gap between their respective conductors which is at least 0.075*W1. In some such implementations, the nominal operating gap may be at least 0.15*W1.

In some implementations, the conductive loops or conductive loop portions of the sensing elements comprise approximately parallel conductor segments that are oriented perpendicular to the measuring axis direction and that are configured to align with or overlap the interior area, and the parallel conductor segments are spaced at the nominal sensing element width dimension DSEN along the measuring axis direction. In some implementations, the similar conductive plates or similar conductive loops of the signal modulating elements of the first type may comprise approximately parallel plate edges or approximately parallel conductive loop segments, respectively, that are oriented perpendicular to the measuring axis direction axis direction. Those parallel plate edges or parallel conductive loop segments bound the effective region of their associated signal modulating element. In such implementations, those parallel plate edges or parallel conductive loop segments are spaced at the average dimension DSME along the measuring axis direction.

DETAILED DESCRIPTION

Figure 1:
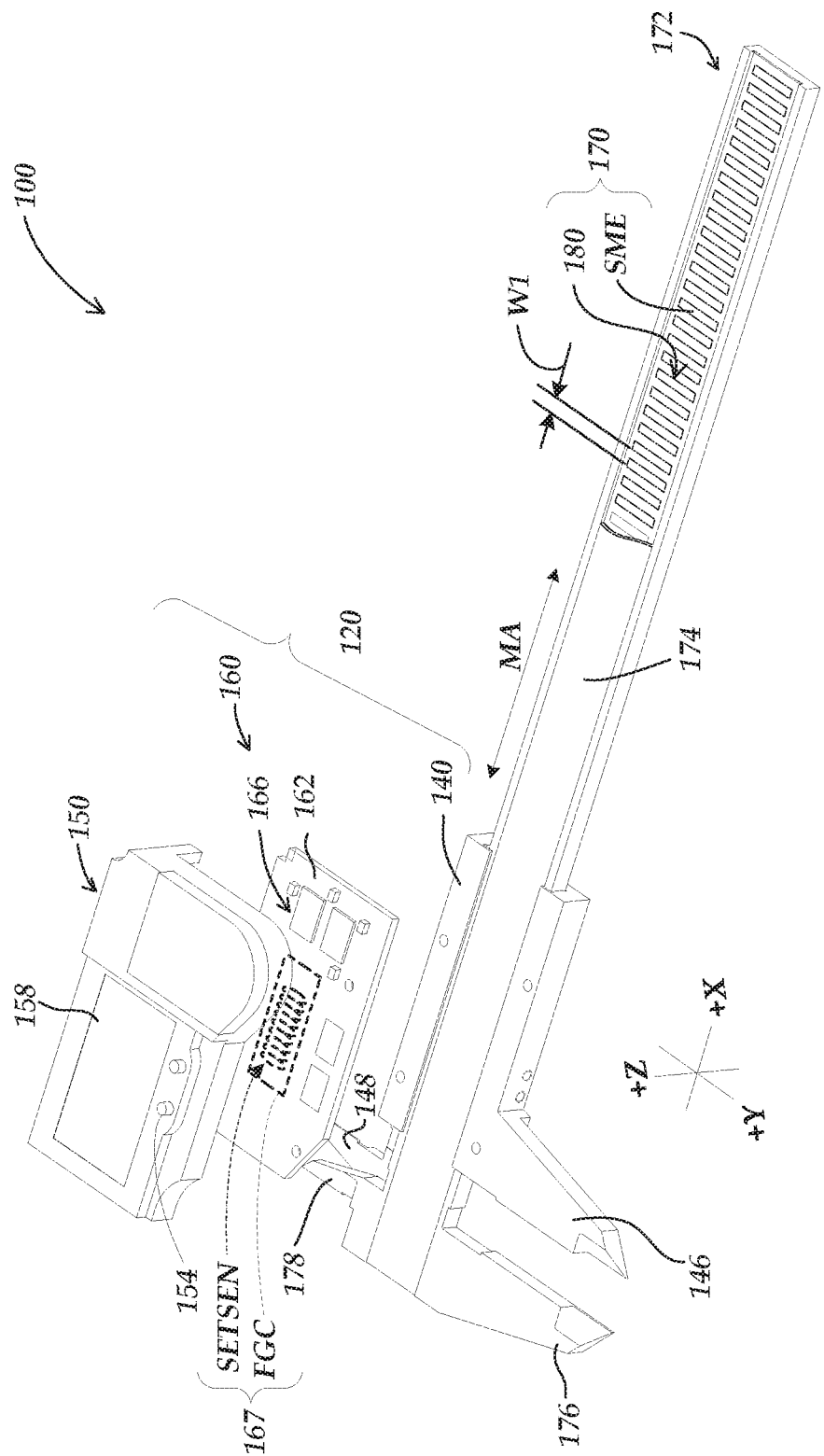
FIG. 1 is an exploded isometric view diagram of a hand tool type caliper utilizing an inductive electronic position encoder including a detector portion and a scale.

FIG. 1 is an exploded isometric view diagram of a hand tool type caliper 100 including a scale member 172 and slider assembly 120. The scale member 172 may comprise a spar of roughly rectangular cross-section including a scale 170 positioned in a groove therein. The slider assembly 120 may include a base 140, an electronic assembly 160, and a cover 150, described in greater detail below. The electronic assembly 160 may include a detector portion 167 and a signal processing configuration 166 arranged on a substrate 162. A resilient seal (not shown) may be compressed between the cover 150 and the substrate 162 to exclude contamination from the circuitry and connections. The scale 170, the detector portion 167 and the signal processing configuration 166 work cooperatively to provide an inductive electronic position encoder that is usable to measure a relative position between two elements (e.g., between the scale member 172 and slider assembly 120) along a measuring axis direction MA.

In various implementations, the scale 170 extends along the measuring axis direction MA (e.g., corresponding to an x-axis direction) and includes a signal modulating scale pattern 180, comprising signal modulating elements SME fabricated on a scale substrate (e.g., using known printed circuit fabrication methods). In various implementations illustrated herein, the signal modulating scale pattern 180 may alternatively be referred to as a periodic scale pattern 180, which is shown to have a spatial wavelength W1 in FIG. 1. In the illustrated implementation, a known type of cover layer 174 (e.g., 100 μm thick) covers the scale 170 (as shown by a cut away portion in FIG. 1.)

In various implementations, the mechanical structure and operation of the caliper 100 may be similar to that of certain prior electronic calipers, such as that of commonly assigned U.S. Pat. No. 5,901,458; and/or 6,400,138; and/or RE37490, each of which is hereby incorporated herein by reference in their entirety. Jaws 176 and 178 near a first end of the scale member 172 and movable jaws 146 and 148 on the slider assembly 120 are used to measure dimensions of objects in a known manner. The measured dimension may be displayed on a digital display 158, which is mounted within the cover 150 of the electronic assembly 160. The cover 150 may also include an on/off switch 154 and other optional control buttons if desired, which actuate circuits or elements included in the electronic assembly 160. The base 140 of the slider assembly 120 may include various known elements that are configured to guide it along a mating edge of the scale member 172 to ensure proper alignment for measuring, while moving the slider assembly 120 relative to the scale 170.

As shown in FIG. 1, the detector portion 167 may include a field generating coil FGC and a set of sensing elements SETSEN arranged along the measuring axis direction MA. In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the Z axis direction. The front face of the detector 167 (e.g., its constituent conductors) may be covered by an insulative coating. The structure and operation of the field generating coil FGC and the set of sensing elements SETSEN are described in greater detail below.

It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. Even small improvements in any of these factors are highly desirable, but difficult to achieve, especially in light of the design constraints imposed in order to achieve commercial success in the various applications. The principles disclosed and claimed herein provide improvements in a number of these factors.

Figure 2:
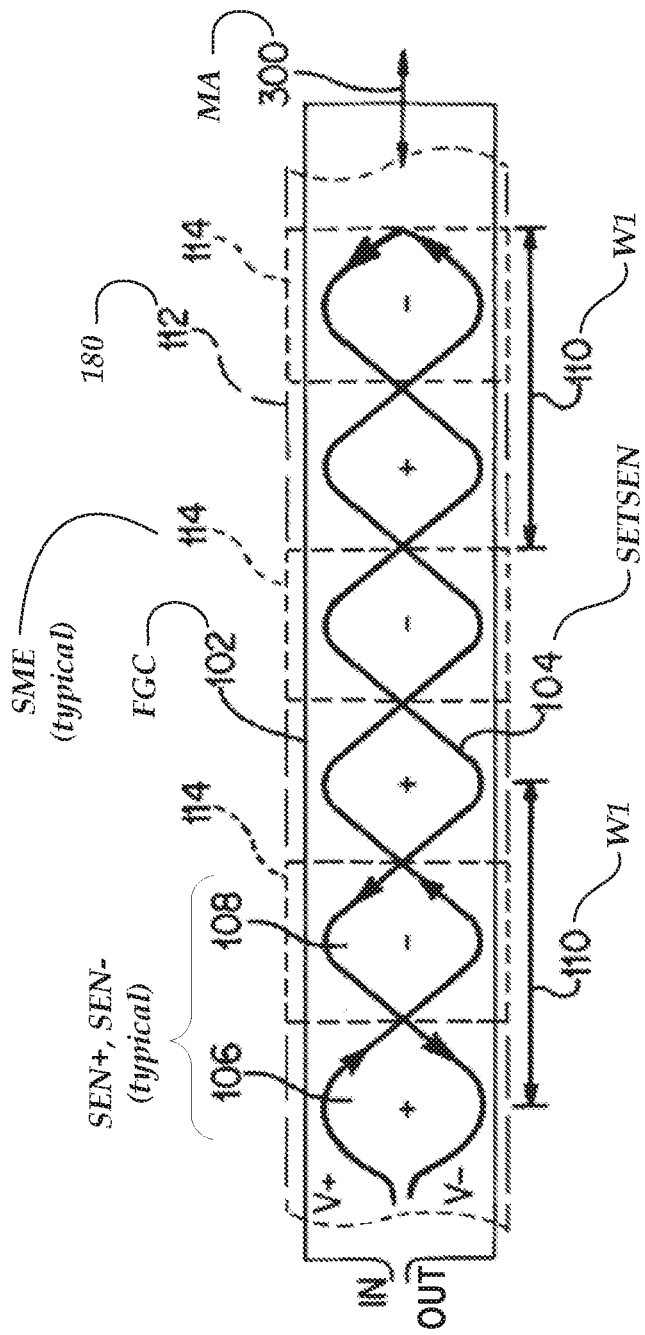
FIG. 2 is a plan view diagram schematically illustrating certain features of a representative prior art inductive electronic position encoder, presented as background information that is relevant to various principles disclosed herein.

FIG. 2 is a plan view diagram schematically illustrating certain features of a representative prior art inductive electronic position encoder shown in the previously incorporated '389 patent, presented as background information that is relevant to various principles disclosed elsewhere herein.

FIG. 2 furthermore includes reference numeral annotations to show the comparable reference numerals or symbols used to designate comparable elements in other figures included here. In the following abbreviated description, which is based on the disclosure of the '389 patent, the comparable reference numbers in other figures of the present disclosure are shown in parentheses following the original reference numerals from the '389 patent. A full description related to the prior art FIG. 2 may be found in the '382 patent. Therefore, only an abbreviated description including teachings from the '382 patent that are relevant to the present disclosure is included here. As far as the inventor has been able to ascertain, the teachings outlined below with reference to FIG. 2 represent the conventional reasoning and conventional design practice known in the art and/or used in commercial inductive electronic position encoders.

As disclosed in the '389 patent, a transducer such as that shown in FIG. 2 includes at least two substantially coplanar paths of wire or windings. A transmitter winding 102 (FGC) forms a large planar loop. A receiver winding 104 (SETSEN), in substantially the same plane as the transmitter winding 102, is laid out in one direction as indicated by the arrows in a zig-zag or sinusoidal pattern and then in a reverse direction as indicated by the arrows so that the winding crosses over itself to form alternating loops 106 (SEN+) and 108 (SEN−) interposed between each other, as shown. As a result, each of the alternating loops 106 (SEN+) and 108 (SEN−) of the receiver winding 104 (SETSEN) have a different winding direction as compared to adjacent loops. By applying an alternating (changing) current to the transmitter winding 102 (FGC), the transmitter winding produces a time-varying magnetic field, extending through the loops 106 (SEN+) and 108 (SEN−) of the receiver winding 104 (SETSEN).

If a scale or scale pattern 112 (180) (a segment of which is outlined by edges indicating alternating long-dash lines and short-dash lines in FIG. 2), including a conductive object (e.g., a conductive plate 114 (SME), several of which are outlined using short-dash lines on the scale pattern 112 in FIG. 2) is moved close to the transducer, the varying magnetic field generated by the transmitter winding 102 (FGC) will induce eddy currents in the conductive object, which in turn sets up a magnetic field from the object that counteracts the varying transmitter magnetic field. As a result, the magnetic flux that the receiver winding 104 (SETSEN) receives is altered or disrupted, thereby causing the receiver winding to output a non-zero EMF signal (a voltage) at the output terminals V+ and V− of the receiver winding 104, which will change polarity as the conductive object moves between the "+" and "−" loops 106 (SEN+) and 108 (SEN−).

The distance between the location of two loops of the same polarity, (e.g., between the location of a loop 106 (SEN+) to the location of the next loop 106 (SEN+)) is defined as a pitch or wavelength 110 (W1) of the transducer. If the conductive object described above (e.g., a conductive plate 114 (SME)) is proximate to the receiver winding 104 (SETSEN) and is continuously varied in position along a measuring axis 300 (MA), the AC amplitude of the signal output from the receiver winding (SETSEN) will vary continuously and periodically with the wavelength 110 (W1) due to the periodic alteration of the loops 106 (SEN) and 108 (SEN) and local disruption of the transmitted magnetic field caused by the conductive object (e.g., a conductive plate 114 (SME)).

The '389 patent emphasizes that if the conductive object (e.g., a conductive plate 114 (SME)) is much smaller or larger than the loops 106 and/or 108 (SEN+, SEN−), then the amplitude of the signal output will be weak and high accuracy will be difficult to obtain. The signal output will have a large amplitude and, thus, be most sensitive to position of the conductive object (e.g., a conductive plate 114 (SME)) if it has a length equal to about half the wavelength 110 (W1) (i.e., when it is possible for the object to be positioned coincident with the loops 106 or 108 (SEN+ or SEN−) exactly). Consequently, the present invention preferably employs conductive objects (e.g., conductive plates 114 (SME)) that have a length equal to one half the wavelength 110 (W1).

It will be appreciated that the transmitter winding 102 (FGC) and the receiver winding 104 (SETSEN) shown in FIG. 2 and described above are one example of a prior art implementation of elements that are designated as a detector portion herein (e.g., the detector portion 167 shown in FIG. 1.) The scale or scale pattern 112 (180) is one example of a prior art implementation that is designated as a scale pattern herein (e.g., the scale pattern 180 shown in FIG. 1.)

Figure 3:
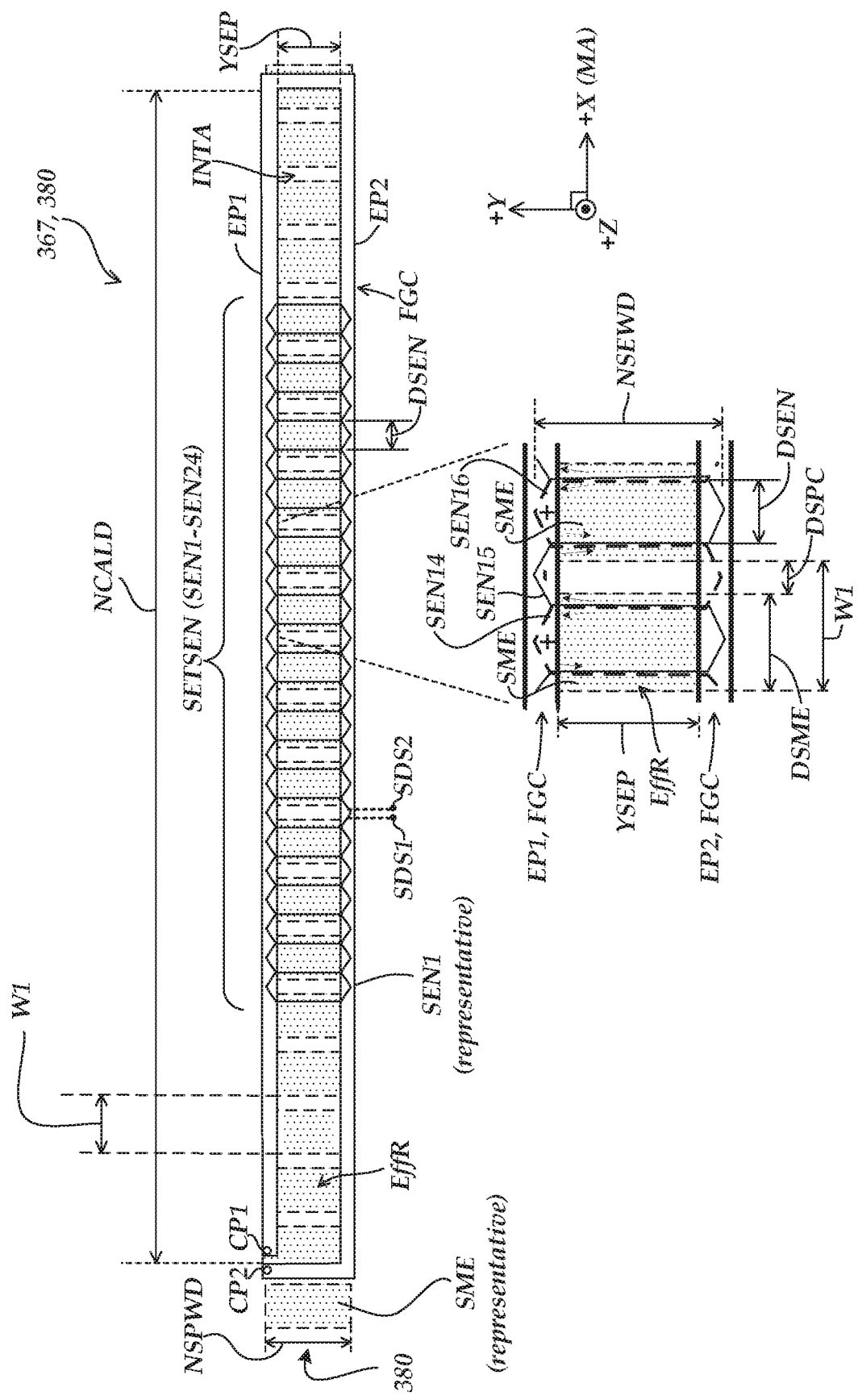
FIG. 3 is a plan view diagram of a first exemplary implementation of a detector portion and scale pattern usable in an electronic position encoder such as that shown in FIG. 1, along with various dimensions that may characterize their features according to principles disclosed herein.

FIG. 3 is a plan view diagram of a first exemplary implementation of a detector portion 367 and scale pattern 380 usable in an electronic position encoder such as that shown in FIG. 1, or the like, along with various dimensions that may characterize their features according to principles disclosed herein. Various features of the detector portion 367 and scale pattern 380 are configured to fulfill various design principles disclosed and claimed herein. It will be appreciated that certain numbered components 3XX of FIG. 3 may correspond to and/or provide similar operations or functions as similarly numbered components 1XX of FIG. 1 and/or FIG. 2 (e.g., detector portion 367 provides similar operations or functions to detector portion 167), and may be similarly understood unless otherwise indicated.

FIG. 3 may be regarded as partly representational, partly schematic. An enlarged section of the detector portion 367 and scale pattern 380 is illustrated in the lower portion of FIG. 3. In FIG. 3, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on the following description. Throughout the figures of this disclosure, it will be appreciated that the illustrated x-axis, y-axis and/or z-axis dimensions of one or more elements may be exaggerated for clarity, but it will be understood that they are not intended to contradict the various dimensional design principles and relationships disclosed and claimed herein.

The illustrated portion of the scale pattern 380 includes a first type of signal modulating elements SME shown in dashed outline. The periodic scale pattern 380 has a spatial wavelength W1. In this implementation, the signal modulating elements SME of the first type comprise similar conductive plates (e.g., as formed by regions fabricated on a printed circuit board, or as formed by raised regions extending from a conductive substrate). However, in other implementations they may comprise similar conductive loops (e.g., as formed by traces on a printed circuit board), as described in greater detail below. In either case, they are located along the measuring axis direction MA corresponding to the spatial wavelength W1. The scale pattern 380 is generally implemented on a scale (e.g., the scale 170 shown in FIG. 1). The y-direction extremes of most of the signal modulating elements SME are hidden below the first and second elongated portions EP1 and EP2 of the field generating coil FGC in the implementation illustrated in FIG. 3. It will be appreciated that the scale pattern 380 moves relative to the detector portion 367 during operation, as may be seen in FIG. 1.

In the example of FIG. 3, the scale pattern 380 has a nominal scale pattern width dimension NSPWD along the y-axis direction and comprises generally rectangular signal modulating elements SME that are arranged periodically along the measuring axis direction MA (e.g., corresponding to the x-axis direction). However, more generally the scale pattern 380 may comprise various alternative spatially modulated patterns including alternative signal modulating element configurations, provided that the pattern has a spatial characteristic which changes as a function of position along the x-axis direction, so as to provide position dependent detector signals (also referred to as detector signal components, in some implementations) arising in the sensing elements SEN (e.g., SEN14) of the set of sensing elements SETSEN in the detector portion 367.

Figure 4:
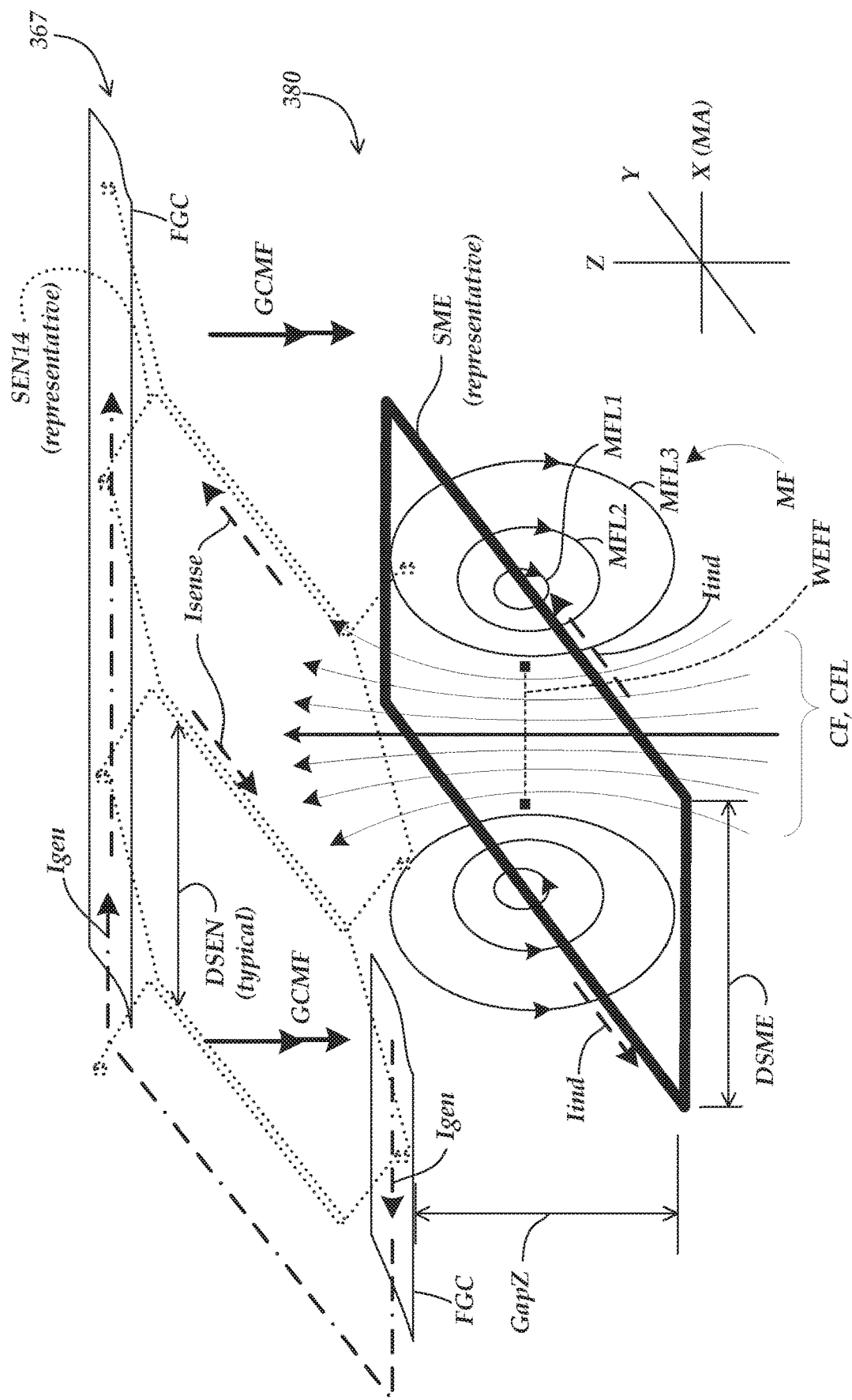
FIG. 4 is an enlarged isometric view of a portion of the detector portion and scale pattern shown in FIG. 3, including a qualitative representation of a magnetic flux and flux coupling characteristics that may be associated with the operation of a signal modulating element in such a position encoder.

In various implementations, the detector portion 367 is configured to be mounted proximate to the scale pattern 380, and to move along the measuring axis direction MA relative to the scale pattern 380. The detector portion includes a field generating coil FGC and a set of sensing elements SETSEN, which may take a variety of alternative configurations to be used in combination with a variety of corresponding signal processing schemes in various implementations, as will be understood by one skilled in the art. FIG. 3 shows a single representative set of sensing elements SEN1-SEN24, which in this implementation comprise sensing loop elements (alternatively referred to as sensing coil elements or sensing winding elements) which are connected in series. In this implementation, adjacent loop elements are connected by a configuration of conductors on various layers of PCB (e.g., connected by feedthroughs) according to known methods (e.g., as illustrated in FIG. 4) such that they have opposite winding polarities. That is, if a first loop responds to a changing magnetic field with a positive polarity detector signal contribution, then the adjacent loops respond with a negative polarity detector signal contribution. Loops having a positive polarity detector signal contribution may be designated SEN+ sensing elements herein, and loops having a negative polarity detector signal contribution may be designated SEN− sensing elements in various contexts herein. In this implementation, the sensing elements are connected in series such that their detector signals or signal contributions are summed, and a "summed" detector signal is output at the detector signal output connections SDS1 and SDS2 to a signal processing configuration (not shown).

Although FIG. 3 shows a single set of sensing elements to avoid visual confusion, it will be appreciated that in various implementations it is advantageous to configure the detector to provide one or more additional sets of sensing elements at a different spatial phase position (e.g., to provide quadrature signals), as will be understood by one of ordinary skill in the art. However, it should be appreciated that the configurations of sensing elements described herein are exemplary only, and not limiting. As one example, individual sensing element loops may output individual signals to a corresponding signal processing configuration in some implementations, for example as disclosed in commonly assigned copending U.S. patent application Ser. No. 15/199,723, filed Jun. 30, 2016, which is hereby incorporated by reference in its entirety. More generally, various known sensing element configurations may be used in combination with the principles disclosed and claimed herein, for use in combination with various known scale pattern and signal processing schemes, in various implementations.

The various members of the set of sensing elements SETSEN and the field generating coil FGC may be fixed on a substrate (e.g., substrate 162 of FIG. 1). The field generating coil FGC may be described as surrounding an interior area INTA having a nominal coil area length dimension NCALD along the x-axis direction and a nominal coil area width dimension of approximately YSEP along the y-axis direction. The interior area INTA is aligned with the periodic scale pattern 380 of signal modulating elements SME during operation, approximately as illustrated. In the illustrated implementation, the field generating coil FGC comprises a single turn surrounding the interior area INTA. However, it will be understood that in various other implementations, the field generating coil FGC may comprise a plurality of turns, and/or meander to operationally surround (e.g., operationally partially surround) the interior area INTA that is aligned with the scale pattern 380, as well as to operationally surround (e.g., operationally partially surround) other interior areas aligned with scale tracks that include other scale patterns, as disclosed in the incorporated references. In any case, in operation the field generating coil FGC generates a changing magnetic flux in the interior area INTA in response to a coil drive signal. In the illustrated implementation, the first and second connection portions CP1 and CP2 may be used to connect a coil drive signal from a signal processing configuration (e.g., the signal processing configuration 166 of FIG. 1) to the field generating coil FGC.

The set of sensing elements SETSEN (e.g., the sensing elements SEN1-SEN24) are arranged along the x-axis direction (e.g., corresponding to the measuring axis direction MA) and are fixed on the substrate (e.g., substrate 162 of FIG. 1). As shown in FIG. 3, the members of the set of sensing elements comprise conductive loops or conductive loop portions (e.g., SEN1-SEN24) having a nominal sensing element width dimension DSEN along the x-axis direction (the measuring axis direction MA), at least for that portion of the sensing element that is aligned with or overlaps the interior area INTA. In the example of FIG. 3, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The members of the set of sensing elements SETSEN are configured to provide detector signals which respond to a local effect on the changing magnetic flux provided by an adjacent signal modulating elements SME of the scale pattern 380 (e.g., one or more signal modulating elements SME). A signal processing configuration (e.g., the signal processing configuration 166 of FIG. 1, etc.) may be configured to determine a position of the set of sensing elements SETSEN relative to the scale pattern 380 based on the detector signals input from the detector portion 367. In general, the field generating coil FGC and the set of sensing elements SETSEN, or the like, may operate according to known principles (e.g., for inductive encoders), such as those described in the incorporated references.

In various implementations, the field generating coil FGC and the sensing elements SEN are insulated from one another (e.g., as located in different layers of a printed circuit board, etc.). In one such implementation, the nominal sensing element width dimension NSEWD of the sensing elements SEN is advantageously greater than the nominal coil area width dimension YSEP and extends beyond the interior edges of the elongated portions EP1 or EP2 by an amount defined as an overlap dimension. In addition, the field generating coil FGC may be advantageously configured such that the trace width of the elongated portions EP1 and EP2 along the y-axis direction is larger than the corresponding overlap dimension. In various implementations, the elongated portions EP1 and EP2 may be fabricated on a first layer of a printed circuit board, and the sensing elements SEN may comprise conductive loops fabricated in one or more layers of the printed circuit board that include a layer different than the first layer, at least in the vicinity of the overlap dimension.

As previously indicated, in some implementations the field generating coil FGC may comprise a conductive trace or traces fabricated on the printed circuit board, and the members SEN of the set sensing elements SETSEN may comprise magnetic flux sensing loops or loop portions formed by conductive traces fabricated on the printed circuit board. As described above with respect to FIG. 1, in various implementations the detector portion 367 may be included in various types of measurement instruments (e.g., calipers, micrometers, gauges, linear scales, etc.). For example, the detector portion 367 may be fixed to a slide member, and the scale pattern 380 may be fixed to a beam or spar member having a measuring axis that coincides with an x-axis direction. In such a configuration, the slide member may be movably mounted on the beam or spar member and movable along the measuring axis direction MA in a plane that extends along the x-axis direction and a y-axis direction, with a z-axis direction being orthogonal to the plane.

Regarding the enlarged section of the detector portion 367 and scale pattern 380 illustrated in the lower portion of FIG. 3, it shows three exemplary members SEN14, SEN15 and SEN16 of the set sensing elements SETSEN and two exemplary signal modulating elements SME, bordered by portions of the field generating coil FGC. In this implementation, the sensing elements may be formed by traces fabricated on first and second layers of a circuit board with a layer of insulator therebetween. The "first layer" traces are shown as solid lines, and the "second layer" traces are shown as dashed lines. Small arrows show a direction of current flow induced in the traces by a changing magnetic field arising from the field generating coil FGC. It may be seen that the sensing element SEN14 may be characterized as a "SEN+" polarity loop due to its associated current direction, and the adjacent sensing element SEN15 may be characterized as "SEN−" polarity loop due to its associated "opposite polarity" current direction. The next adjacent sensing element SEN16 may again be characterized as a "SEN+" polarity loop, and so on. Various elements shown in the enlarged section in FIG. 3 may be characterized by relationships between the dimensions DSEN and DSME and the spatial wavelength W1.

Figure 5B:
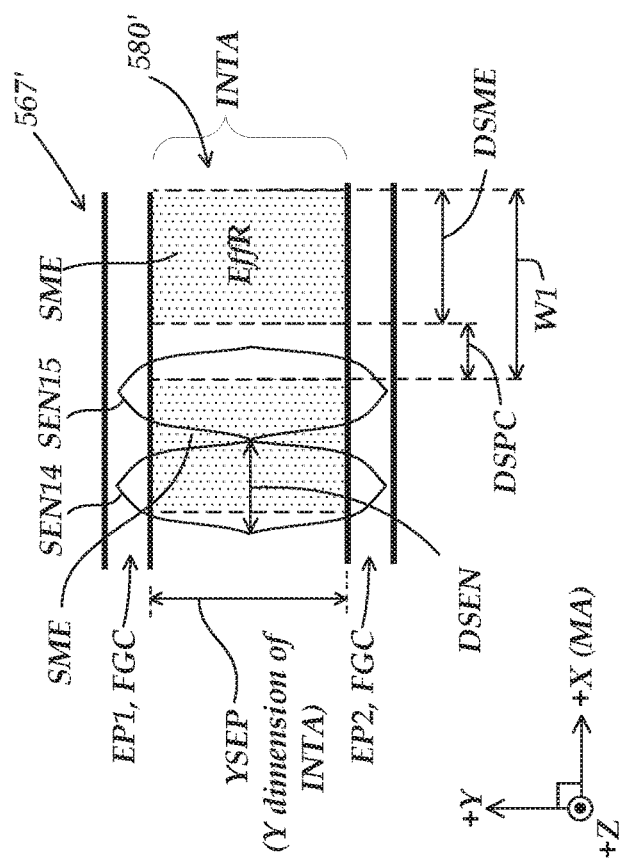
FIGS. 5A and 5B are plan view diagrams schematically illustrating respective inductive electronic position encoder implementations, including certain exemplary dimensions according to principles disclosed herein.
Figure 5A:
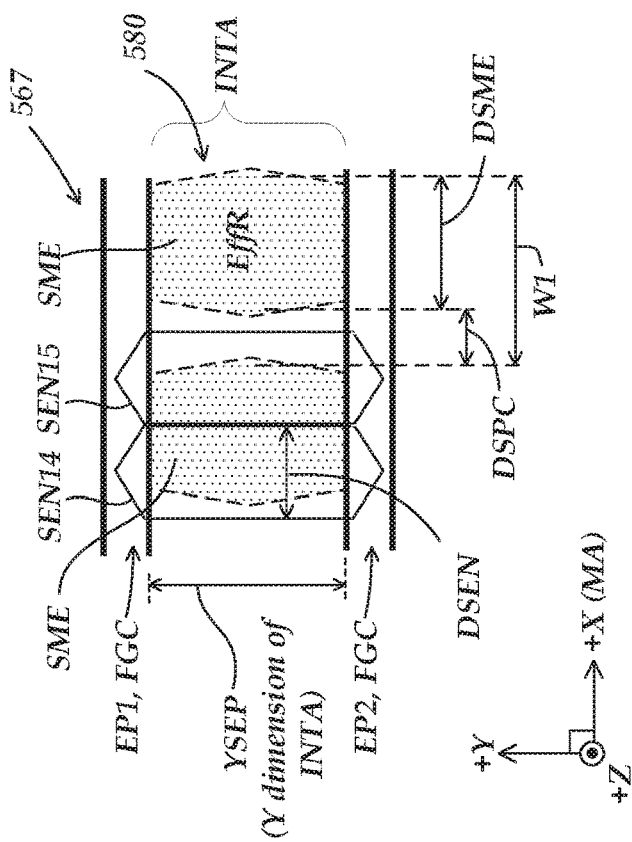

DSEN is the nominal sensing element width dimension along the measuring axis direction MA for that portion of a sensing element SEN that is aligned with or overlaps the interior area INTA. It may be seen that this is the portion of the sensing element SEN that coincides with the span of the dimension YSEP along the y-axis direction. In various implementations, the nominal sensing element width dimension DSEN may be taken as the dimension at the maximum width of a sensing element SEN for that portion that is aligned with or overlaps the interior area INTA. Additional examples of the dimension DSEN for other configurations of sensing elements SEN are shown in FIGS. 5A and 5B.

DSME is the average dimension along the measuring axis direction MA of the "effective region" of a signal modulating elements SME (of the first type). The effective region EffR of a signal modulating element SME is defined here as that portion which is aligned with or overlaps the y-axis dimension of the interior area INTA as well as being aligned with or overlapping the y-axis dimension of the sensing elements SEN. The effective region EffR produces the primary signal modulation effect in the sensing elements SEN. It may be seen that this is the portion of the signal modulating element SME that coincides with the span of the dimension YSEP along the y-axis direction for the implementation shown in FIG. 3, because the dimension YSEP of the interior area INTA of the field generating coil FGC is smaller than, and included within, the −y-axis dimension of the sensing elements SEN. In various implementations, the average dimension DSME of a signal modulating element SME may be taken as the area of the effective region EffR of a signal modulating element SME divided by the y-axis direction dimension of the effective region EffR. Additional examples of the dimension DSME for other configurations of signal modulating elements SME are shown in FIGS. 5A and 5B.

As previously outlined with reference to FIG. 2, it has been conventional for sensing elements, such as the sensing elements SEN, to have a nominal sensing element width dimension DSEN that is 0.5*W1. Such a dimension may be advantageous in various implementations. Furthermore, as previously outlined with reference to FIG. 2, it has also been conventional for signal modulation elements such as the signal modulation elements SME to have an average width dimension DSME that is 0.5*W1, and/or for the average width dimension DSME to be the same as the nominal sensing element width dimension DSEN.

Contrary to the prior art design practice outlined above, it should be appreciated that in some embodiments according to principles disclosed herein, it is not strictly necessary for the nominal sensing element dimension DSEN to be 0.5*W1. Nominal sensing element dimensions DSEN that are less or more than 0.5*W1 may be chosen for various reasons in certain applications and may provide adequate signals and accuracy. For example, in some implementations, DSEN may be any size within a range greater than 0.45*W1 and less than 0.55*W1. Of course, in some implementations, DSEN may be approximately 0.5*W1.

Regardless of the size of the nominal sensing element dimension DSEN, contrary to prior art design practices, according to principles disclosed and claimed herein it is advantageous if the average width dimension DSME of the signal modulating elements SME is larger than the nominal sensing element dimension DSEN, and also fulfills certain conditions in relation to the spatial wavelength W1. In particular, the inventor has determined that it is advantageous if the effective region of the signal modulating elements SME is configured to have an average dimension DSME along the measuring axis direction wherein DSME is greater than the nominal sensing element width dimension DSEN along the measuring axis direction, and DSME is at least 0.55*W1 and at most 0.8*W1. Such a configuration provides advantageous detector signal characteristics (e.g., providing better a signal to noise (S/N) ratio, and or reduced error components in the detector signals), in comparison to configurations according to prior art design principles. In some such implementations, it may be advantageous if the average dimension DSME is at most 1.6*DSEN. In some implementations, it may be advantageous if the average dimension DSME is at least 0.6*W1, or at least 0.66*W1 in other implementations, or at least 0.7*W1 in other implementations. For example, the use of larger values of the average dimension DSME may be advantageous when using larger operating gaps between the detector portion 367 and the scale pattern 380, and/or when the signal modulating elements SME of the first type comprise conductive plates, as described in greater detail below, with reference to FIG. 4.

FIG. 4 is an enlarged isometric view of a portion of the detector portion 367 and scale pattern 380 shown in FIG. 3, including a qualitative representation of a magnetic flux and flux coupling characteristics that may be associated with the operation of a signal modulating element SME in such a position encoder.

FIG. 4 shows the response of a signal modulating element SME to a generated changing magnetic field GCMF provided by the field generating coil FGC as outlined previously. As shown in FIG. 4, an applied coil drive signal current Igen in the field generating coil FGC generates the changing magnetic field GCMF, which inductively couples to the signal modulating element SME. The signal modulating element SME is schematically illustrated as a conductive loop in FIG. 4. In response to the coupled changing magnetic field GCMF, an induced current Iind is produced in the signal modulating element SME, which generates an induced magnetic field represented by flux lines (the flux lines including arrow heads in FIG. 4). The illustrated flux lines represent a central magnetic flux CF represented by the central magnetic flux lines CFL, and a marginal magnetic flux MF represented by the closed marginal magnetic flux lines MFL1-MFL3, which are shown encircling the conductive loop of the signal modulating element SME.

Generally speaking, it will be understood that the members of the set of sensing elements SETSEN produce signals (or signal contributions) that are responsive to the induced changing magnetic flux that is represented as outlined above. In particular, the produced signals are responsive to the amount of magnetic flux that is effectively coupled through their interior loop area, to produce a signal contribution or signal component, which is represented as a current Isense in the sensing element SEN14 in FIG. 4. As shown in FIG. 4, in various implementations, the detector portion 367 and the scale pattern 380 may be approximately planar (e.g., they may include or be formed on approximately planar substrates) and the detector portion 367 may be configured to be mounted approximately parallel to the periodic scale pattern 380 with a nominal operating gap GapZ between their respective conductors. For example, in various implementations the nominal operating GapZ may be at least 0.075*W1, to facilitate practical assembly and alignment tolerances. In some such implementations, the nominal operating gap may be at least 0.15*W1. As shown in FIG. 4, the central magnetic flux CF will generally be effectively coupled through the sensing element SEN14 over a practical range of operating gaps. However, due to the operating gap at least some of the marginal magnetic flux MF may not be effectively coupled through the sensing element SEN14. For example, at a relatively larger dimension for the operating gap GapZ, as exaggerated in FIG. 4, none of the marginal magnetic flux lines MFL1-MFL3 are coupled through the sensing element SEN14, and do not contribute to the current Isense. As a result, for the configuration qualitatively illustrated in FIG. 4, the effective width Weff (represented by a dashed bar line in FIG. 4) of the signal modulating element SME that is sensed by the sensing element SEN14 corresponds only to the coupled central magnetic flux lines CFL. It may be seen in FIG. 4, that even as the operational gap GapZ is reduced, for example to couple the marginal magnetic flux line MFL3 through the sensing element SEN14, the effective width Weff would still be less than the average dimension DSME of the signal modulating element SME. Thus, contrary to prior art teachings outlined above with reference to FIG. 2, a signal modulating element SME advantageously has an average dimension DSME that is greater than the nominal sensing element width dimension DSEN, in order to have an effective width Weff that corresponds to the nominal sensing element width dimension DSEN of a sensing element SEN, in order to produce the maximum signal variation as it is moved past that sensing element along the measuring axis direction. For example, in some implementations it may be desirable for the dimension DSEN and the dimension Weff to be approximately 0.5*W1, which according to the foregoing discussion means that when using a practical operational gap GapZ the average dimension DSME of a signal modulating element SME may desirably be at least 0.6*W1 in some such implementations.

As a further consideration, it should be appreciated that spatial filtering of various spatial harmonics in the detector signals (e.g., as may arise in the sensing current Isense) may also depend on the effective width Weff, rather than the average dimension DSME of the signal modulating element SME. For example, when the dimension DSEN of the sensing elements SEN in the detector portion 367 is approximately 0.5*W1, the even numbered spatial harmonics are largely eliminated from the detector signals. However, the odd spatial harmonics corresponding to 0.33*W1, and so on, may remain. If it is desired to spatially filter the third spatial harmonic, it may be desirable for the dimension Weff to be approximately 0.66*W1, which according to the foregoing discussion means that the average dimension DSME of a signal modulating element SME may be desirably at least 0.66*W1, or at least 0.7*W1, or more, in order to produce the desired dimension Weff that provides the desired spatial filtering.

It should be appreciated that when the signal modulating elements SME are conductive plates, rather than conductive loops as shown in FIG. 4, a distribution of "concentric" eddy currents may be produced in such conductive plates in response to the generated changing magnetic field GCMF. These eddy currents are operationally comparable to the induced current Iind shown in FIG. 4. However, if the conductive plate has an average dimension DSME that is the same as the conductive loop SME shown in FIG. 4, then due to their distributed "concentric" pattern of its eddy currents, their "equivalent current location" will be somewhere inside the edges of the conductive plate, resulting an even smaller effective width Weff that that associated with a conductive loop of similar size. Consequently, it may be especially desirable for a conductive plate type signal modulating element SME to have an average dimension DSME that is toward the larger end of the desirable ranges outlined above.

FIGS. 5A and 5B are plan view diagrams schematically illustrating respective inductive electronic position encoder implementations, illustrating further examples of the dimensions DSEN and DSME previously outlined with reference to FIG. 3. It will be appreciated that certain numbered components 5XX of FIGS. 5A and 5B may correspond to and/or provide similar operations or functions as similarly numbered components 3XX of FIG. 3, and may be similarly understood unless otherwise indicated.

In the implementation shown in FIG. 3, the conductive loops or conductive loop portions of the sensing elements SEN comprise approximately parallel conductor segments that are oriented along the y-axis direction (perpendicular to the measuring axis direction), and that are configured to align with or overlap the interior area INTA, and the parallel conductor segments are spaced at the nominal sensing element width dimension DSEN along the measuring axis direction. In addition, the similar conductive plates (or similar conductive loops) of the signal modulating elements SME of the first type comprise approximately parallel plate edges (or approximately parallel conductive loop segments), that are oriented along the y-axis direction (perpendicular to the measuring axis direction). Those parallel plate edges (or parallel conductive loop segments) bound the effective region of their associated signal modulating element SME. In such implementations, those parallel plate edges (or parallel conductive loop segments) are spaced at the average dimension DSME along the measuring axis direction. However, in various implementations, the boundaries extending along the y-axis direction of the sensing elements SEN and/or the signal modulating elements SME are not required to be straight or parallel.

FIGS. 5A and 5B show the spatial wavelength W1 and the previously outlined dimensions DSEN, and DSME, as applied to a non-straight boundary profile for the signal modulating elements SME in FIG. 5A, and for a non-straight boundary profile for a sensing element in FIG. 5B. The previously outlined effective region EffR of the signal modulating elements SME is also indicated. As previously outlined, DSEN is the nominal sensing element width dimension along the measuring axis direction MA for that portion of a sensing element SEN that is aligned with or overlaps the interior area INTA. It may be seen that this is the portion of the sensing element SEN that coincides with the span of the dimension YSEP along the y-axis direction. In various implementations, the nominal sensing element width dimension DSEN may be taken as the dimension at the maximum width of a sensing element SEN for that portion that is aligned with or overlaps the interior area INTA. DSME is the average dimension along the measuring axis direction MA of the effective region EffR of a signal modulating element SME (of the first type).

The effective region EffR of a signal modulating element SME is defined here as that portion which is aligned with or overlaps the y-axis dimension of the interior area INTA as well as being aligned with or overlapping the y-axis dimension of the sensing elements SEN. The effective region EffR produces the primary signal modulation effect in the sensing elements SEN. It may be seen that this is the portion of the signal modulating element SME that coincides with the span of the dimension YSEP along the y-axis direction for the implementation shown in FIGS. 5A and 5B, because the dimension YSEP of the interior area INTA of the field generating coil FGC is smaller than, and included within, the −y-axis dimension of the sensing elements SEN. However, this need not be the case in all implementations, and the previous definition of the effective region EffR is more general. In various implementations, the average dimension DSME of a signal modulating element SME may be taken as the area of the effective region EffR of a signal modulating element SME divided by the y-axis direction dimension of the effective region EffR.

FIGS. 5A and 5B also illustrate a dimension DSPC, which is the equal to W1 minus DSME. Described a first way, the dimension DSPC may be described as corresponding to "non-signal modulating space" between the signal modulating elements SME of the first type. However, more generally described a second way that applies to various other implementations of a periodic scale pattern, the dimension DSPC may be described as corresponding to signal modulating elements of a second type are located between the signal modulating elements SME of the first type along the measuring axis direction. The signal modulating elements of the second type are configured to have relatively less effect on the changing magnetic flux in comparison to the signal modulating elements SME of the first type. For example, in some implementations, the signal modulating elements of the second type comprise regions of non-conductive material. In some such implementations, the signal modulating elements of the second type comprise regions of a non-conductive scale substrate, wherein the first type of signal modulating elements SME comprise conductors fabricated and/or fixed on the non-conductive scale substrate. As another example, in some implementations, the signal modulating elements of the second type may comprise "more deeply recessed" regions of a conductive material used to form the scale pattern and the signal modulating elements SME of the first type may comprise "unrecessed" regions of the conductive material.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction, the electronic position encoder comprising:
   a scale extending along the measuring axis direction which includes a periodic scale pattern comprising at least a first type of signal modulating elements, wherein the periodic scale pattern has a spatial wavelength W1 and signal modulating elements of the first type comprising conductive plates that are located along the measuring axis direction corresponding to the spatial wavelength W1, and wherein the signal modulating elements of the first type each have a same shape and each have a same average dimension DSME along the measuring axis direction, for which the average dimension DSME is an edge to edge value that includes the entire width of a respective conductive plate of the conductive plates, wherein the entire width is a dimension in the measuring axis direction, and wherein non-signal modulating spaces between the signal modulating elements of the first type each have a same shape and a same average dimension DSPC along the measuring axis direction which is equal to W1 minus DSME;
   a detector portion configured to be mounted proximate to the periodic scale pattern and to move along the measuring axis direction relative to the periodic scale pattern, the detector portion comprising:
      a field generating coil fixed on a substrate, the field generating coil surrounding an interior area configured to be aligned with the periodic scale pattern of the signal modulating elements during operation, the field generating coil configured to generate a changing magnetic flux in the interior area in response to a coil drive signal; and a set of sensing elements arranged along the measuring axis direction and fixed on the substrate, members of the set of sensing elements comprising conductive loops having a nominal sensing element width dimension DSEN along the measuring axis direction for that portion of the sensing element that is aligned with or overlaps the interior area, for which the nominal sensing element width dimension DSEN is an edge to edge value that includes the entire maximum width of a respective conductive loop of the conductive loops, wherein the entire maximum width is a dimension in the measuring axis direction, and wherein the set of sensing elements are configured to provide detector signals which respond to a local effect on the changing magnetic flux provided by adjacent signal modulating elements of the signal modulating elements of the scale pattern; and a signal processing configuration that is operably connected to the detector portion to provide the coil drive signal and is configured to determine a relative position between the detector portion and the scale pattern based on the detector signals input from the detector portion, wherein DSME is greater than DSEN, and DSME is at least 0.7*W1 and at most 0.8*W1.

2. The electronic position encoder of claim 1 wherein the average dimension DSME is at most 1.6*DSEN.

3. The electronic position encoder of claim 1 wherein 0.45*W1<DSEN<0.55*W1.

4. The electronic position encoder of claim 1 wherein DSEN is approximately 0.5*W1.

5. The electronic position encoder of claim 1 wherein the scale includes an approximately planar scale substrates and the detector portion is configured to be mounted approximately parallel to the periodic scale pattern with a nominal operating gap between the detector portion and the scale pattern which is at least 0.075*W1.

6. The electronic position encoder of claim 5 wherein the nominal operating gap is at least 0.15*W1.

7. The electronic position encoder of claim 1, wherein the conductive loops of the sensing elements comprise parallel conductor segments that are perpendicular to the measuring axis direction, and that are configured to align with or overlap the interior area, and the parallel conductor segments are spaced at the nominal sensing element width dimension DSEN along the measuring axis direction.

8. The electronic position encoder of claim 1, wherein the conductive plates of the signal modulating elements of the first type that each have the same shape and each have the same average dimension DSME along the measuring axis direction comprise approximately parallel plate edges that are perpendicular to the measuring axis direction and that bound their effective region, and those parallel plate edges are spaced at the average dimension DSME along the measuring axis direction.

9. The electronic position encoder of claim 1 wherein the average dimension DSME is more than 0.7*W1.

10. The electronic position encoder of claim 9 wherein the average dimension DSME is less than 0.8*W1.

11. The electronic position encoder of claim 1 wherein the signal modulating elements are each configured to have an effective width Weff that is sensed by the sensing elements, for which the effective width Weff results from the average dimension DSME and the effective width Weff is less than the average dimension DSME.

12. The electronic position encoder of claim 11 wherein the effective width Weff is closer to 0.66*W1 than the average dimension DSME is to 0.66*W1.

13. The electronic position encoder of claim 12 wherein the effective width Weff is configured to provide a spatial filtering of a third harmonic from the detector signals.

14. The electronic position encoder of claim 13 wherein the effective width Weff is approximately 0.66*W1.

15. The electronic position encoder of claim 13 wherein the average dimension DSME is less than 0.8*W1.

16. The electronic position encoder of claim 15 wherein the average dimension DSME is more than 0.7*W1.

* * * * *